US010300342B2

(12) United States Patent
Nakajima

(10) Patent No.: US 10,300,342 B2
(45) Date of Patent: May 28, 2019

(54) RUBBER COMPOSITION FOR GOLF BALL, AND GOLF BALL

(71) Applicant: Bridgestone Sports Co., Ltd., Tokyo (JP)

(72) Inventor: Tsuyoshi Nakajima, Saitamaken (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 1 day.

(21) Appl. No.: 15/588,928

(22) Filed: May 8, 2017

(65) Prior Publication Data

US 2017/0368419 A1 Dec. 28, 2017

(30) Foreign Application Priority Data

Jun. 22, 2016 (JP) ................. 2016-123561

(51) Int. Cl.
*C08L 9/00* (2006.01)
*C08F 279/02* (2006.01)
*C08K 5/098* (2006.01)
*A63B 37/02* (2006.01)
*A63B 37/00* (2006.01)

(52) U.S. Cl.
CPC ...... *A63B 37/0051* (2013.01); *A63B 37/0063* (2013.01); *A63B 37/0074* (2013.01); *A63B 37/0075* (2013.01); *A63B 37/0076* (2013.01); *C08F 279/02* (2013.01)

(58) Field of Classification Search
None
See application file for complete search history.

(56) References Cited

U.S. PATENT DOCUMENTS

| 7,342,073 B2 | 3/2008 | Voorheis | |
|---|---|---|---|
| 2013/0244810 A1* | 9/2013 | Mikura | A63B 37/0051 473/372 |
| 2013/0296074 A1* | 11/2013 | Ozawa | C08K 5/14 473/372 |
| 2015/0065268 A1* | 3/2015 | Nakajima | A63B 37/006 473/373 |

FOREIGN PATENT DOCUMENTS

| JP | 59-075932 A | | 4/1984 |
|---|---|---|---|
| JP | 59075932 | * | 4/1984 |
| JP | 60-060866 A | | 4/1985 |
| JP | 3-207709 A | | 9/1991 |
| JP | 03207709 | * | 9/1991 |
| JP | 2005-177511 A | | 7/2005 |

* cited by examiner

*Primary Examiner* — David J Buttner
(74) *Attorney, Agent, or Firm* — Sughrue Mion, PLLC

(57) ABSTRACT

A rubber composition for golf balls includes (A) a base rubber, (B) two different metal salts of α,β-unsaturated carboxylic acids having 3 to 8 carbon atoms, (C) a metal salt in which at least one bonding site is a fatty acid of 9 or more carbon atoms, and (D) a crosslinking initiator. Letting component (B) include (B-1) an unsaturated metal carboxylate in a high compounding weight and (B-2) an unsaturated metal carboxylate in a low compounding weight, the ratio (B-2)/(B-1) is from 4 to 20 wt % and the ratio (B-2)/(C) is from 20 to 115 wt %. By using this rubber composition in a golf ball core, the golf ball can be endowed with both good spin properties and good durability on impact.

9 Claims, 3 Drawing Sheets

RUBBER COMPOSITION FOR GOLF BALL, AND GOLF BALL

CROSS-REFERENCE TO RELATED APPLICATION

This non-provisional application claims priority under 35 U.S.C. § 119(a) on Patent Application No. 2016-123561 filed in Japan on Jun. 22, 2016, the entire contents of which are hereby incorporated by reference.

TECHNICAL FIELD

This invention relates to a rubber composition for golf balls, and to a golf ball in which such a composition is used. More particularly, the invention relates to a rubber composition for golf balls which can be suitably used as the core material in golf balls having a core of at least one layer and a cover of at least one layer, and to a golf ball in which such a composition is used.

BACKGROUND ART

Golf balls lately are predominantly either two-piece solid golf balls or three-piece solid golf balls. These golf balls generally have a structure in which a cover of one layer or a plurality of layers made of various types of resin materials encases a core made of a rubber composition. The core accounts for most of the golf ball volume and exerts a large influence on ball properties such as rebound, feel and durability. Recently, a number of disclosures have been made in which the cross-sectional hardness of the core is suitably adjusted so as to impart a specific core hardness gradient, thereby optimizing the spin properties of the ball on full shots with a driver or an iron and thus enabling the ball to travel an increased distance.

Methods for adjusting the cross-sectional hardness of the core include, for example, suitably adjusting the compounding ingredients in the core rubber composition or the vulcanization temperature and time. With regard to the compounding ingredients in the core rubber composition, it is possible to select the types of co-crosslinking agent and organic peroxide used and to adjust their contents. In terms of co-crosslinking agents, the use of methacrylic acid, acrylic acid and metal salts thereof is known in the field of golf balls.

For example, JP-A S59-75932, JP-A S60-60866 and JP-A H03-207709 describe the joint use of given amounts of zinc acrylate and zinc methacrylate in the base rubber. Also, JP-A 2015-177511 (and corresponding U.S. Pat. No. 7,342,073) disclose art in which a co-crosslinking agent and zinc methacrylate are used together with a halogenated organosulfur compound.

However, although the golf balls in these prior-art publications do relate to art in which zinc acrylate and zinc methacrylate are jointly compounded, the principal object is to enhance durability; such art is unable to provide satisfactory spin properties. Moreover, because fatty acid metal salts are not included in the composition, a hardness profile capable of conferring satisfactory spin properties is not obtained. In addition, there is a concern over chemicals adhering to mixing equipment such as a kneader or roll mill, lowering productivity.

SUMMARY OF THE INVENTION

It is therefore an object of this invention to provide a rubber composition for golf balls which confers both good spin properties and durability when the golf ball is hit and which also imparts a high ball productivity. Another object is to provide a golf ball made using such a rubber composition.

As a result of extensive investigations, I have discovered that, in a rubber composition for a golf ball core, by including (A) a base rubber, (B) two different metal salts of $\alpha,\beta$-unsaturated carboxylic acids having 3 to 8 carbon atoms, (C) a metal salt in which at least one bonding site is a fatty acid of 9 or more carbon atoms, and (D) a crosslinking initiator, letting component (B) include (B-1) an unsaturated metal carboxylate in a high compounding weight and (B-2) an unsaturated metal carboxylate in a low compounding weight such that the ratio (B-2)/(B-1) is from 4 to 20 wt %, and setting the ratio (B-2)/(C) to from 20 to 115 wt %, a good balance can be achieved between the durability of the golf ball and the spin properties.

That is, upon focusing on the compounding ingredients in a rubber composition for golf balls, and paying particular attention to the compounding ratio between two unsaturated metal carboxylates (e.g., zinc acrylate and zinc methacrylate) which are used as co-crosslinking agents and a fatty acid metal salt (e.g., zinc stearate) which is used as a vulcanization co-accelerator, I have found that by adjusting the compounding ratio of these in the above way, it is possible to achieve a hardness profile in the vulcanized core which is characterized by a large hardness difference between the core surface and the core center, a somewhat steep hardness gradient in the intermediate portion of the core, and a somewhat gradual hardness gradient on the surface side. I have also learned that it is possible with such a hardness profile to increase the durability of the ball while maintaining good spin properties.

Accordingly, in a first aspect, the invention provides a rubber composition for golf balls, which composition includes (A) a base rubber, (B) two different metal salts of $\alpha,\beta$-unsaturated carboxylic acids having 3 to 8 carbon atoms, (C) a metal salt in which at least one bonding site is a fatty acid of 9 or more carbon atoms, and (D) a crosslinking initiator. Letting component (B) include (B-1) an unsaturated metal carboxylate in a high compounding weight and (B-2) an unsaturated metal carboxylate in a low compounding weight, the ratio (B-2)/(B-1) is from 4 to 20 wt % and the ratio (B-2)/(C) is from 20 to 115 wt %.

Component (B-1) is preferably zinc acrylate and component (B-2) is preferably zinc methacrylate.

Component (C) is preferably zinc stearate and/or zinc monostearate monoacrylate.

The rubber composition may also include (E) water.

This rubber composition is preferably adapted for use in a golf ball core.

In a second aspect, the invention provides a golf ball having a core and a cover of one or more layer that encases the core, wherein the core is formed of the rubber composition according to the first aspect of the invention.

The golf ball may have a core hardness profile wherein the JIS-C hardness difference between a surface and a center of the core is at least 20 and the hardness gradient between a point located 72.6% of the core radius from the core center and the core surface is from 0.79 to 1.87.

The golf ball may have a core hardness profile wherein the JIS-C hardness difference between a surface and a center of the core is at least 20 and the hardness gradient between a point located 72.6% of the core radius from the core center and a point located 31.1% of the core radius from the core center is from 1.49 to 2.08.

The golf ball may have a core hardness profile wherein the JIS-C hardness difference between a surface and a center of the core is at least 20 and the hardness gradient between a point locate 62.3% of the core radius from the core center and the core surface is from 1.10 to 2.45.

The golf ball may have a core hardness profile wherein the JIS-C hardness difference between a surface and a center of the core is at least 20 and the hardness gradient between a point located 62.3% of the core radius from the core center and a point located 31.1% of the core radius from the core center is from 0.78 to 1.93.

The golf ball preferably has a core hardness profile in which the hardness remains the same or increases, and does not decrease, from the center toward the surface of the core.

Advantageous Effects of the Invention

When the rubber composition of the invention is used in a golf ball, and particularly in a golf ball core, the golf ball can be imparted with both good spin properties and good durability at impact.

BRIEF DESCRIPTION OF THE DIAGRAMS

DESCRIPTION OF THE PREFERRED EMBODIMENTS

Figure 1:
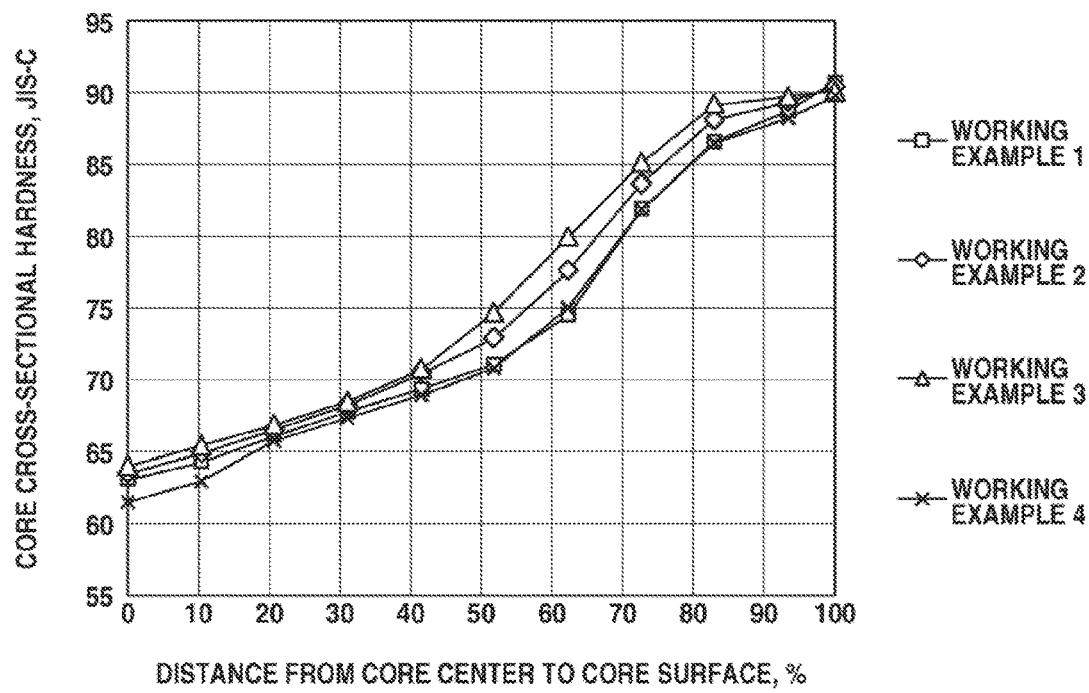
FIG. 1 is a graph showing the hardness profiles of the golf ball cores in Working Examples 1 to 4.

The objects, features and advantages of the invention will become more apparent from the following detailed description, taken in conjunction with the foregoing diagrams.

The rubber composition for golf balls of the invention is characterized by including the following components:
(A) a base rubber,
(B) two different metal salts of α,β-unsaturated carboxylic acids having 3 to 8 carbon atoms,
(C) a metal salt in which at least one bonding site is a fatty acid of 9 or more carbon atoms, and
(D) a crosslinking initiator.

Component (A) is a base rubber. It is suitable to use a polybutadiene as the base rubber. The polybutadiene has a cis-1,4-bond content of at least 60% (here and below, "%" stands for percent by weight), preferably at least 80%, more preferably at least 90%, and most preferably at least 95%. When the cis-1,4-bond content is too low, the resilience decreases. The content of 1,2-vinyl bonds in the polybutadiene is preferably 2% or less, more preferably 1.7% or less, and even more preferably 1.5% or less.

The polybutadiene has a Mooney viscosity ($ML_{1+4}$ (100° C.)) of preferably at least 30, and more preferably at least 35, with the upper limit being preferably not more than 100, and more preferably not more than 90.

Illustrative examples of cis-1,4-polybutadiene rubber that may be used as the above polybutadiene include the high-cis products BR01, BR11, BR02, BR02L, BR02LL, BR730 and BR51, all of which are available from JSR Corporation.

In the practice of the invention, from the standpoint of obtaining a molded and vulcanized rubber composition having a good resilience, the polybutadiene rubber is preferably one that has been synthesized using a rare-earth catalyst or a group VIII metal compound catalyst.

The rare-earth catalyst is not particularly limited, although preferred use can be made of one that uses a lanthanum series rare-earth compound. Where necessary, an organoaluminum compound, an alumoxane, a halogen-containing compound and a Lewis base may be used in combination with the lanthanum series rare-earth compound. Preferred use may be made of, as the various foregoing compounds, those mentioned in JP-A H11-35633, JP-A H11-164912 and JP-A 2002-293996.

Of these rare-earth catalysts, the use of catalysts which employ the lanthanum series rare-earth elements neodymium, samarium and gadolinium are preferred, with the use of neodymium catalysts being especially recommended. In such cases, a polybutadiene rubber having a high cis-1,4 bond content and a low 1,2-vinyl bond content can be obtained at an excellent polymerization activity.

The polybutadiene accounts for a proportion of the overall rubber that is preferably at least 40 wt %, more preferably at least 60 wt %, even more preferably at least 80 wt %, and most preferably at least 90 wt %. The above polybutadiene may account for 100 wt % of the base rubber, although it is preferably not more than 98 wt %, and more preferably not more than 95 wt %, of the base rubber.

The base rubber may also include rubber components other than the above polybutadiene, provided that doing so does not detract from the advantageous effects of the invention. Examples of rubber components other than the above polybutadiene include other polybutadienes, and other diene rubbers such as styrene-butadiene rubbers, natural rubbers, isoprene rubbers and ethylene-propylene-diene rubbers.

Component (B) is two different metal salts of α,β-unsaturated carboxylic acids having from 3 to 8 carbon atoms, as exemplified by unsaturated carboxylic acids such as acrylic acid, methacrylic acid, maleic acid and fumaric acid that are neutralized with desired metal ions. In the two metal salts of α,β-unsaturated carboxylic acids (also referred to below as "unsaturated metal carboxylates"), the metal may be the same or different and the carboxylic acid may be the same or different, so long as both the metal and the carboxylic acid are not the same. Illustrative examples include the zinc salts and magnesium salts of methacrylic acid and acrylic acid. The use of zinc acrylate and zinc methacrylate is especially preferred. The total content of unsaturated metal carboxylates per 100 parts by weight of the base rubber is preferably at least 10 parts by weight, more preferably at least 15 parts by weight, and even more preferably at least 20 parts by weight. The upper limit is preferably not more than 60 parts by weight, more preferably not more than 55 parts by weight, and even more preferably not more than 50 parts by weight.

Letting component (B) include (B-1) an unsaturated metal carboxylate in a high compounding weight and (B-2) an unsaturated metal carboxylate in a low compounding weight, the ratio (B-2)/(B-1) is from 4 to 20 wt %, and preferably from 5 to 15 wt %. At a small ratio, the hardness gradient in the intermediate portion of the core is flat and the hardness gradient near the core surface is too steep, as a result of which a satisfactory durability cannot be obtained. At a large ratio, the hardness gradient in the intermediate portion of the core increases and the hardness gradient near the core surface is too gradual, as a result of which satisfactory spin properties are not achieved. Moreover, when this ratio is large, the core initial velocity decreases, leading to a decline in the distance traveled by the ball.

(B-1) is preferably a zinc salt of acrylic acid, methacrylic acid, maleic acid or fumaric acid. From the standpoint of the core resilience, it is more preferably zinc acrylate. (B-2) is preferably a zinc salt of methacrylic acid, maleic acid or fumaric acid. With regard to the combination of (B-1) and (B-2), it is desirable for component (B-1) to be zinc acrylate and for component (B-2) to be zinc methacrylate.

Component (C) is a metal salt in which at least one bonding site is a fatty acid of 9 or more carbon atoms. As used herein, "bonding site" refers to a moiety where the metal and the fatty acid are bonded; the number of bonding sites differs with the type of metal. Specifically, sodium and potassium have one bonding site, zinc and calcium have two, and iron and aluminum have three. Illustrative examples of fatty acids of 9 or more carbon atoms include lauric acid, myristic acid, palmitic acid and stearic acid. By neutralizing these fatty acids with the metals mentioned above, it is possible to obtain a metal salt in which at least one bonding site with the metal is a fatty acid of 9 or more carbon atoms. Illustrative examples include sodium stearate, potassium stearate, zinc stearate, calcium stearate, iron stearate and aluminum stearate. Of these, it is preferable to use zinc stearate. In zinc stearate, which could more accurately be referred to as "zinc distearate," a stearic acid molecule is bonded to each of the two bonding sites on zinc.

Alternatively, in the case of zinc salts, for example, so long as one of the two zinc bonding sites is a fatty acid of 9 or more carbon atoms, the two molecules that bond to the zinc may be different. In such cases, the prefix "mono" is affixed to the name of the compound so as to distinguish it from the above double-bonded metal salts (disalts). Illustrative examples include zinc monostearate monopalmitate, zinc monostearate monomyristate, zinc monostearate monolaurate, zinc monopalmitate monomyristate, zinc monopalmitate monolaurate, zinc monostearate monoacrylate, zinc monostearate monomethacrylate, zinc monostearate monomaleate, zinc monostearate monofumarate, zinc monopalmitate monoacrylate, zinc monopalmitate monomethacrylate, zinc monopalmitate monomaleate, zinc monopalmitate monofumarate, zinc monomyristate monoacrylate, zinc monomyristate monomethacrylate, zinc monomyristate monomaleate, zinc monomyristate monofumarate, zinc monolaurate monoacrylate, zinc monolaurate monomethacrylate, zinc monolaurate monomaleate and zinc monolaurate monofumarate. Zinc monostearate monoacrylate is preferred.

The ratio (B-2)/(C) is from 20 to 115 wt %, preferably from 25 to 110 wt %, and more preferably from 30 to 105 wt %. Outside of this range, a suitable hardness profile cannot be obtained, making it impossible to achieve both a good durability and good spin properties. Moreover, undesirable effects arise during core production, leading to a decline in productivity.

Component (D) is a crosslinking initiator. This crosslinking initiator is preferably an organic peroxide. Illustrative examples include dicumyl peroxide (Percumyl D, from NOF Corporation), 2,5-dimethyl-2,5-di(t-butylperoxy)hexane (Perhexa 25B, from NOF Corporation) and di-(2-t-butylperoxyisopropyl)benzene (Perbutyl P, from NOF Corporation). The use of dicumyl peroxide is preferred. These may be used singly, or two or more may be used together.

The rubber composition of the invention may further include (E) water, although this is not an essential ingredient. The water used for this purpose is not particularly limited and may be distilled water or tap water, although the use of distilled water that is free of impurities is preferred. The amount of water included per 100 parts by weight of the base rubber is preferably at least 0.1 part by weight, and more preferably at least 0.3 part by weight. The upper limit is preferably not more than 5 parts, and more preferably not more than 4 parts by weight.

It is also possible to add water directly to the rubber composition. The following methods (i) to (iii) may be used to incorporate water in the composition:

(i) applying steam or ultrasonically applying water in the form of a mist to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is added directly to the composition, enabling the efficiency of golf ball production to be increased.

Aside from above components (A) to (E), various additives such as fillers, antioxidants and organosulfur compounds may also be included, provided that doing so does not detract from the advantageous effects of the invention.

Fillers that may be suitably used include zinc oxide, barium sulfate and calcium carbonate. These may be of one type alone, or two or more may be used together. The amount of filler included per 100 parts by weight of the base rubber is preferably at least 1 part by weight, and more preferably at least 3 parts by weight. The upper limit per 100 parts by weight of the base rubber is preferably not more than 200 parts by weight, more preferably not more than 150 parts by weight, and even more preferably not more than 100 parts by weight. When too much or too little filler is included, it may not be possible to obtain a proper weight and a suitable rebound.

Commercial products such as Nocrac NS-6, Nocrac NS-30 and Nocrac 200 (all available from Ouchi Shinko Chemical Industry Co., Ltd) may be used as the antioxidant. These may be of one type used alone, or of two or more types used together. The amount of antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.4 part by weight. When too much or too little antioxidant is included, it may not be possible to obtain a proper core hardness gradient, which may make it impossible to obtain a suitable rebound, durability, and spin rate-lowering effect on full shots.

An organosulfur compound may be included in the rubber composition so as to impart a good resilience. The addition of a thiophenol, thionaphthol, halogenated thiophenol or metal salt thereof is recommended. Illustrative examples include the zinc salts of pentachlorothiophenol, pentafluorothiophenol, pentabromothiophenol and parachlorothiophenol, and also diphenylpolysulfides, dibenzylpolysulfides, dibenzoylpolysulfides, dibenzothiazoylpolysulfides and dithiobenzoylpolysulfides having from 2 to 4 sulfurs. The use of diphenyldisulfide and the zinc salt of pentachlorothiophenol is especially preferred. The amount of organosulfur compound included per 100 parts by weight of the base rubber is preferably at least 0.05 part by weight, more preferably at least 0.07 part by weight, and even more preferably at least 0.1 part by weight. The upper limit in the amount included is preferably not more than 5 parts by weight, more preferably not more than 4 parts by weight, even more preferably not more than 3 parts by weight, and most preferably not more than 2 parts by weight. When the organosulfur compound content is too high, the hardness becomes too low. On the other hand, when this content is too low, the golf ball is unlikely to have an increased rebound.

The core can be produced by vulcanizing and curing the rubber composition containing the above ingredients. For example, core production may be carried out by intensively mixing the rubber composition using a mixing apparatus such as a Banbury mixer or a roll mill, compression molding or injection molding the mixed composition using a core mold, and then suitably heating the molded body for 10 to 40 minutes at a temperature of about 100 to 200° C., which is sufficient for the organic peroxide or co-crosslinking agent to act, thereby curing the molded body.

Here, owing to the compounding described above, the vulcanized and cured rubber molding for use in a golf ball has a hardness profile wherein the hardness difference between the surface and center is large and the hardness gradient is somewhat steep in the intermediate portion and somewhat gradual on the surface side. By employing this rubber molding as a golf ball core, the durability of the golf ball can be increased while maintaining the good spin properties of the ball.

In such a rubber molding hardness profile having a large hardness difference between the surface and center and a hardness gradient that is somewhat steep in the intermediate portion and somewhat gradual on the surface side, particularly when this is the hardness profile of a core, the core radius is designated as R (mm), the core center is designated as C, the core surface is designated as S, a point located T % of the core radius from the core center is designated as R(T%), and the JIS-C hardness at each point X is designated as Hx. In this invention, the hardness difference between the surface (S) and center (C) of the core, expressed in terms of JIS-C hardness, is preferably at least 20.

The hardness gradient $[(H_s - H_{R\ (72.6\%)})/(R - 0.726R)]$ between a point R (72.6%) located 72.6% of the core radius from the core center and the core surface (S) is preferably from 0.79 to 1.87.

The hardness gradient $[(H_{R\ (72.6\%)} - H_{R\ (31.1\%)})/(0.726R - 0.311R)]$ between a point R (72.6%) located 72.6% of the core radius from the core center and a point R (31.1%) located 31.1% of the core radius from the core center is preferably from 1.49 to 2.08.

The hardness gradient $[(H_s - H_{R\ (62.3\%)})/(R - 0.623R)]$ between a point R (62.3%) located 62.3% of the core radius from the core center and the core surface is preferably from 1.10 to 2.45.

The hardness gradient $[(H_{R\ (62.3\%)} - H_{R\ (31.1\%)})/(0.623R - 0.311R)]$ between a point R (62.3%) located 62.3% of the core radius from the core center and a point R (31.1%) located 31.1% of the core radius from the core center is preferably from 0.78 to 1.93.

The core hardness profile is preferably such that the hardness remains the same or increases, and does not decrease, from the center toward the surface of the core.

The core diameter, although not particularly limited, is preferably at least 30 mm, and more preferably at least 35 mm, but is preferably not more than 41 mm, and more preferably not more than 40 mm. At a core diameter outside of this range, the initial velocity of the ball may decrease and suitable spin properties may not be obtained.

As described above, the rubber composition is preferably used as a golf ball core. Also, the golf ball of the invention preferably has a structure that includes a core and a cover of at least one layer. The core may be formed as a single layer or as a plurality of two or more layers. As used herein, "cover" refers collectively to the layer (or layers) formed outside the core and is made up of at least one layer. That is, in cases where the cover is made up of a plurality of layers, the cover includes at least an outermost layer and an intermediate layer interposed between the outermost layer and the core. Accordingly, the cover may be a two-layer cover consisting of, in order from the inside: an intermediate layer and an outermost layer. In addition, an envelope layer may be provided between the core and the intermediate layer, in which case the cover may be a three-layer cover consisting of, in order from the inside: an envelope layer, an intermediate layer and an outermost layer. Numerous dimples are generally formed on the outer surface of the outermost layer of the cover.

The materials used to form the respective layers of the cover are not particularly limited. However, various thermoplastic resin materials may be suitably used as the intermediate layer material, with the use of a high-resilience resin material as the intermediate layer material being especially desirable. For example, the use of an ionomer resin material is preferred.

Commercial products may be used as this resin. Illustrative examples include sodium-neutralized ionomer resins such as Himilan 1605, Himilan 1601 and AM 7318 (all from DuPont-Mitsui Polychemicals Co., Ltd.), and Surlyn 8120 (E.I. DuPont de Nemours & Co.); zinc-neutralized ionomer resins such as Himilan 1557, Himilan 1706 and AM 7317 (all from DuPont-Mitsui Polychemicals Co., Ltd.); and the products available from E.I. DuPont de Nemours & Co. under the trade names HPF 1000, HPF 2000 and HPF AD1027, as well as the experimental material HPF SEP1264-3.

Exemplary materials for the cover outermost layer include not only the above-mentioned ionomer resins, but also, from the standpoint of controllability and scuff resistance, polyurethanes. In particular, when using polyurethane as the outermost layer material, a thermoplastic polyurethane elastomer may be employed. A commercial product may be suitably used as this thermoplastic polyurethane elastomer. Illustrative examples include products available from DIC Covestro Polymer Ltd. under the trade name PANDEX and products available from Dainichiseika Color & Chemicals Mfg. Co., Ltd. under the trade name RESAMINE.

From the standpoint of aerodynamic performance, the golf ball of the invention generally is provided with numerous dimples on the surface of the outermost layer. Also, a paint film layer is formed on the cover surface for the sake of aesthetics, durability and the like. The paint that forms this paint film layer is preferably a two-part curable urethane paint. Such two-part curable urethane paints include a base resin composed primarily of a polyol resin and a curing agent composed primarily of polyisocyanate.

The golf ball of the invention has a diameter of not less than 42 mm, preferably not less than 42.3 mm, and more preferably not less than 42.6 mm. The ball diameter is not more than 44 mm, preferably not more than 43.8 mm, even more preferably not more than 43.5 mm, and still more preferably not more than 43 mm.

The golf ball weight is preferably not less than 44.5 g, more preferably not less than 44.7 g, even more preferably not less than 45.1 g, and most preferably not less than 45.2 g. The ball weight is preferably not more than 47.0 g, more preferably not more than 46.5 g, and even more preferably not more than 46.0 g.

The golf ball has a deflection under loading, i.e., when compressed under a final load of 1,275 N (130 kgf) from an initial load of 98 N (10 kgf), of preferably at least 1.5 mm, more preferably at least 1.8 mm, and even more preferably at least 2.0 mm, but preferably not more than 5.0 mm, more preferably not more than 4.5 mm, and even more preferably not more than 4.3 mm. When the ball deflection is too small, the feel at impact may be greatly compromised or the spin rate may rise excessively, as a result of which the desired distance may not be achieved. On the other hand, when the deflection is too large, the initial velocity may be low or the durability may be greatly compromised. The deflection of the golf ball under specific loading refers here to the deflection measured for a completed golf ball having a paint film layer formed on the surface of the cover (outermost layer).

EXAMPLES

Working Examples and Comparative Examples are provided below to illustrate the invention, and are not intended to limit the scope thereof.

Working Examples 1 to 14, Comparative Examples 1 to 6

Cores having a diameter of 38.55 mm were produced by rubber compounding as shown in Tables 1 and 2 below for the respective Working Examples 1 to 14 and Comparative Examples 1 to 6 so as to prepare core compositions, vulcanizing the resulting compositions at 157° C. for 15 minutes, and abrading the surfaces of the vulcanized cores.

TABLE 1

| | | Working Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| Rubber composition (pbw) | (A) Polybutadiene rubber | 100 | 100 | 100 | 100 | 100 | 100 | 100 | 100 | 100 | 100 |
| | Zinc oxide | 4 | 4 | 4 | 4 | 4 | 4 | 4 | 4 | 4 | 4 |
| | Barium sulfate | 5.6 | 5.6 | 5.6 | 5.6 | 5.6 | 5.6 | 5.6 | 5.6 | 5.6 | 5.6 |
| | Antioxidant | 0.1 | 0.1 | 0.1 | 0.1 | 0.1 | 0.1 | 0.1 | 0.1 | 0.1 | 0.1 |
| | Zinc salt of pentachlorothiophenol | 0.5 | 0.5 | 0.5 | 0.5 | 0.5 | 0.5 | 0.5 | 0.5 | 0.5 | 0.5 |
| | (B-1) Unsaturated metal carboxylate 1 | 42.5 | 42.5 | 42.5 | 42.5 | 42.5 | 42.5 | 42.5 | 42.5 | 42.5 | 42.5 |
| | (B-2) Unsaturated metal carboxylate 2 | 2 | 5 | 8.5 | 2 | 2 | 2 | 8.5 | | | 2 |
| | (C) Metal salt of fatty acid 1 | 7.5 | 7.5 | 7.5 | 10 | 2 | | | | 7.5 | |
| | (C) Metal salt of fatty acid 2 | | | | | | 7.5 | 7.5 | | | |
| | (D) Organic peroxide | 1 | 1 | 1 | 1 | 1 | 1 | 1 | 1 | 1 | 1 |
| | (E) Distilled water | 1 | 1 | 1 | 1 | 1 | 1 | 1 | 1 | 1 | 1 |
| Compounding ratios | (B-2)/(B-1) × 100 (%) | 4.7 | 11.8 | 20.0 | 4.7 | 4.7 | 4.7 | 20.0 | 0.0 | 0.0 | 4.7 |
| | (B-2)/(C) × 100 (%) | 26.7 | 66.7 | 113.3 | 20.0 | 100.0 | 26.7 | 113.3 | — | 0.0 | — |

TABLE 2

| | | Working Example | | | | | | | Comparative Example | | |
|---|---|---|---|---|---|---|---|---|---|---|---|
| | | 8 | 9 | 10 | 11 | 12 | 13 | 14 | 4 | 5 | 6 |
| Rubber composition (pbw) | (A) Polybutadiene rubber | 100 | 100 | 100 | 100 | 100 | 100 | 100 | 100 | 100 | 100 |
| | Zinc oxide | 4 | 4 | 4 | 4 | 4 | 4 | 4 | 4 | 4 | 4 |
| | Barium sulfate | 14.6 | 14.6 | 14.6 | 14.6 | 14.6 | 14.6 | 14.6 | 14.6 | 14.6 | 14.6 |
| | Antioxidant | 0.1 | 0.1 | 0.1 | 0.1 | 0.1 | 0.1 | 0.1 | 0.1 | 0.1 | 0.1 |
| | Zinc salt of pentachlorothiophenol | 0.5 | 0.5 | 0.5 | 0.5 | 0.5 | 0.5 | 0.5 | 0.5 | 0.5 | 0.5 |
| | (B-1) Unsaturated metal carboxylate 1 | 25.5 | 25.5 | 25.5 | 25.5 | 25.5 | 25.5 | 25.5 | 25.5 | 25.5 | 25.5 |
| | (B-2) Unsaturated metal carboxylate 2 | 1.2 | 3.5 | 5 | 1.2 | 1.2 | 1.2 | 5 | | | 1.2 |
| | (C) Metal salt of fatty acid 1 | 4.5 | 4.5 | 4.5 | 6 | 1.2 | | | | 4.5 | |
| | (C) Metal salt of fatty acid 2 | | | | | | 4.5 | 4.5 | | | |
| | (D) Organic peroxide | 1 | 1 | 1 | 1 | 1 | 1 | 1 | 1 | 1 | 1 |
| | (E) Distilled water | 1 | 1 | 1 | 1 | 1 | 1 | 1 | 1 | 1 | 1 |

TABLE 2-continued

|  |  | Working Example | | | | | | | Comparative Example | | |
|---|---|---|---|---|---|---|---|---|---|---|---|
|  |  | 8 | 9 | 10 | 11 | 12 | 13 | 14 | 4 | 5 | 6 |
| Compounding ratios | (B-2)/(B-1) × 100 (%) | 4.7 | 13.7 | 19.6 | 4.7 | 4.7 | 4.7 | 19.6 | 0.0 | 0.0 | 4.7 |
|  | (B-2)/(C) × 100 (%) | 26.7 | 77.8 | 111.1 | 20.0 | 100.0 | 26.7 | 111.1 | — | 0 | — |

Details on the rubber compositions in Table 1 are given below.

Polybutadiene rubber: Available under the trade name "BR01" from JSR Corporation.
Zinc oxide: Available as "Zinc Oxide Grade 3" from Sakai Chemical Co., Ltd.
Barium sulfate: Available under the trade name "Barico #100" from Hakusui Tech
Antioxidant: Available under the trade name "Nocrac NS-6" from Ouchi Shinko Chemical Industry Co., Ltd.
Zinc salt of pentachlorothiophenol: Available from Wako Pure Chemical Industries, Ltd.
Unsaturated metal carboxylate 1: Zinc acrylate (Wako Pure Chemical Industries, Ltd.)
Unsaturated metal carboxylate 2: Zinc methacrylate (Wako Pure Chemical industries. Ltd.)
Metal salt of fatty acid 1: Zinc stearate (Wako Pure Chemical Industries, Ltd.)
Metal salt of fatty acid 2: Zinc monostearate monoacrylate (Nippon Shokubai Co., Ltd.)
Distilled water: Available from Wako Pure Chemical Industries, Ltd.
Organic peroxide: Available under the trade name "Percumyl D" from NOF Corporation (1) Cross-Sectional Hardness of Core The core was cut through the center so as to form a planar cross-section. At a temperature of 23±1° C., the indenter of a durometer was set perpendicularly against the cross-section and the JIS-C hardness (JIS K 6301-1975) at the core center was measured, giving a measurement for one core. In each Example, the average for three measured cores was determined. The results are shown in Tables 3 and 4.

(2) Surface Hardness of Core

At a temperature of 23±1° C., the indenter of a durometer was set perpendicularly against the surface portion of the spherical core and the JIS-C hardness at the core surface was measured at four random points. Taking the average of these measurements as the measured value for one core, the average value for three measured cores was determined. The results are shown in Tables 3 and 4.

(3) Cross-Sectional Hardness of Core

The core was cut through the center so as to form a planar cross-section. At a temperature of 23±1° C., the indenter of a durometer was set perpendicularly against the cross-section and the JIS-C hardness at positions located 10.4%, 20.8%, 31.1%, 41.5%, 51.9%, 62.3%, 72.6%, 83.0% and 93.4% of the core radius R from the center of the hemispherical core obtained by cutting the core in half were measured, giving measurements for one core. In each Example, the averages for three measured cores were determined. The results are shown in Tables 3 and 4.

Figure 2:
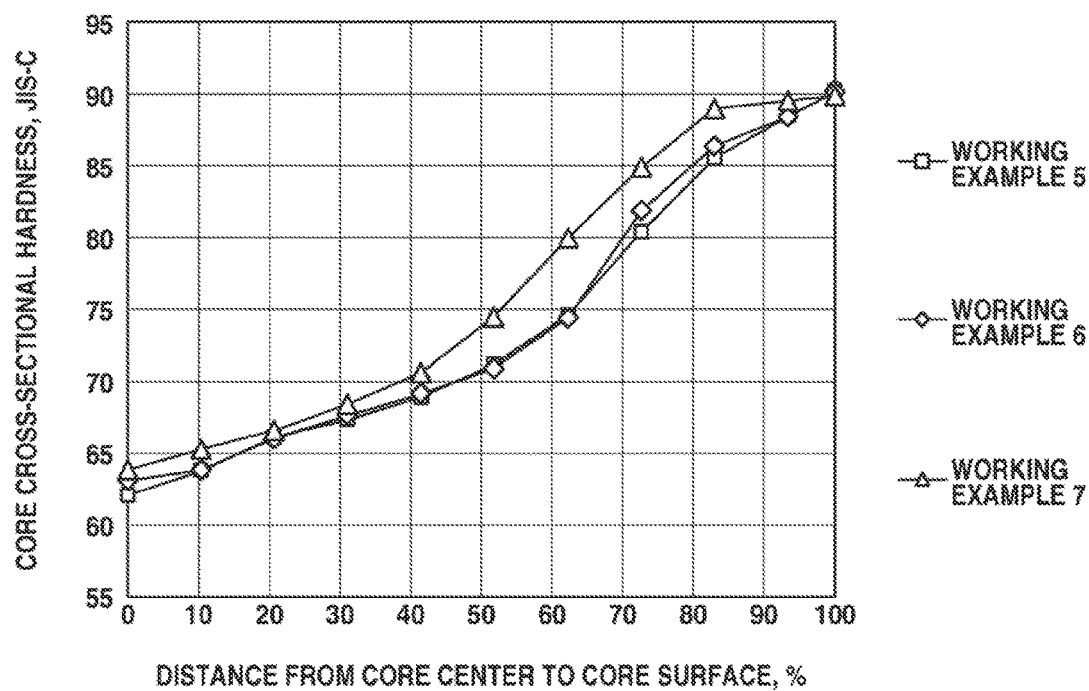
FIG. 2 is a graph showing the hardness profiles of the golf ball cores in Working Examples 5 to 7.
Figure 3:
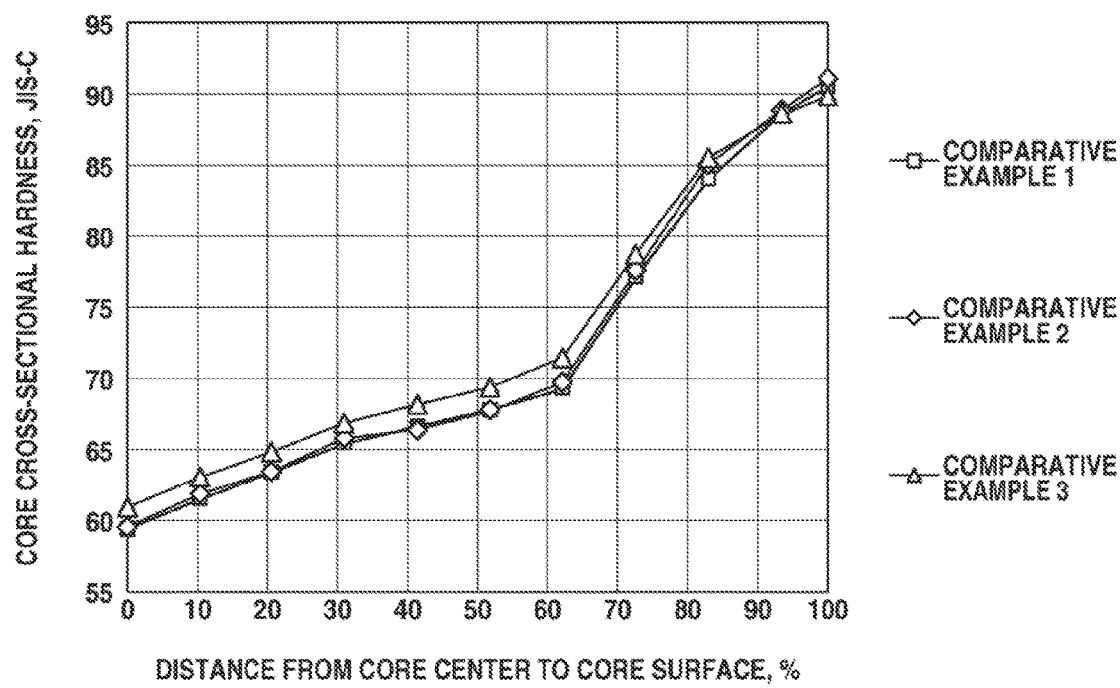
FIG. 3 is a graph showing the hardness profiles of the golf ball cores in Comparative Examples 1 to 3.
Figure 4:
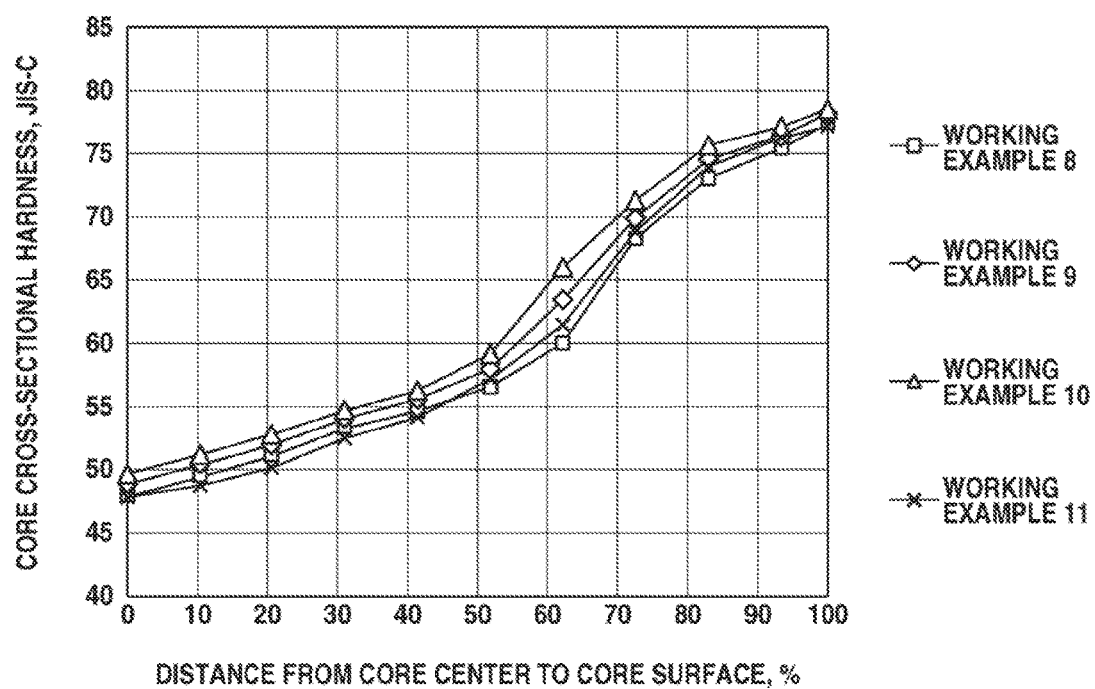
FIG. 4 is a graph showing the hardness profiles of the golf ball cores in Working Examples 8 to 11.
Figure 5:
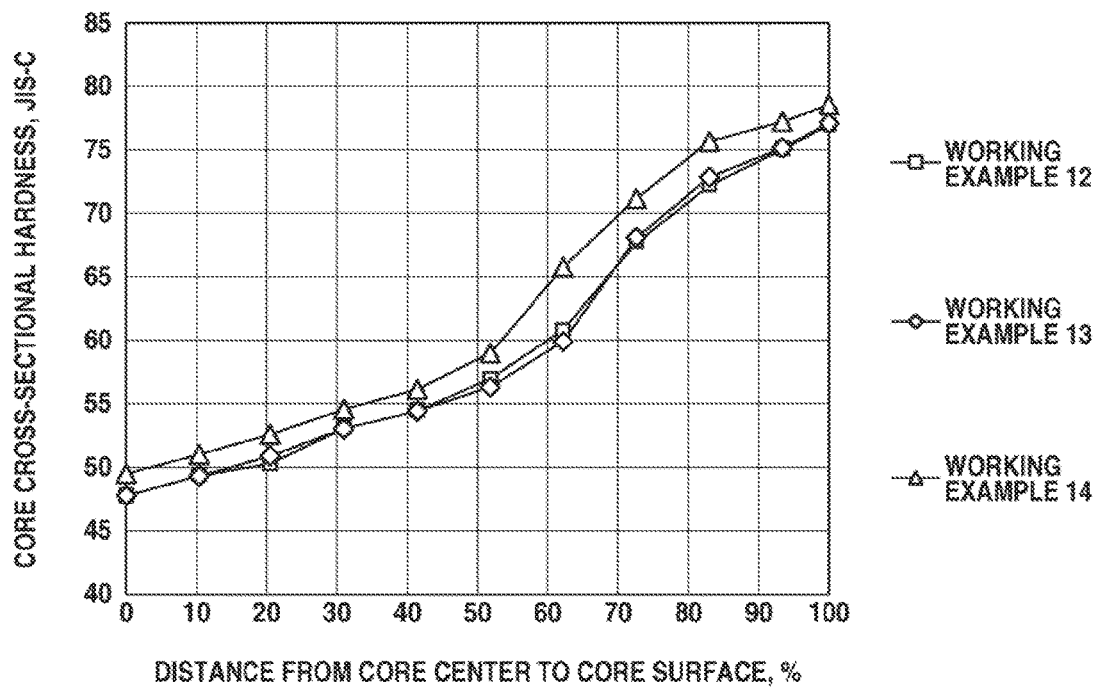
FIG. 5 is a graph showing the hardness profiles of the golf ball cores in Working Examples 12 to 14.
Figure 6:
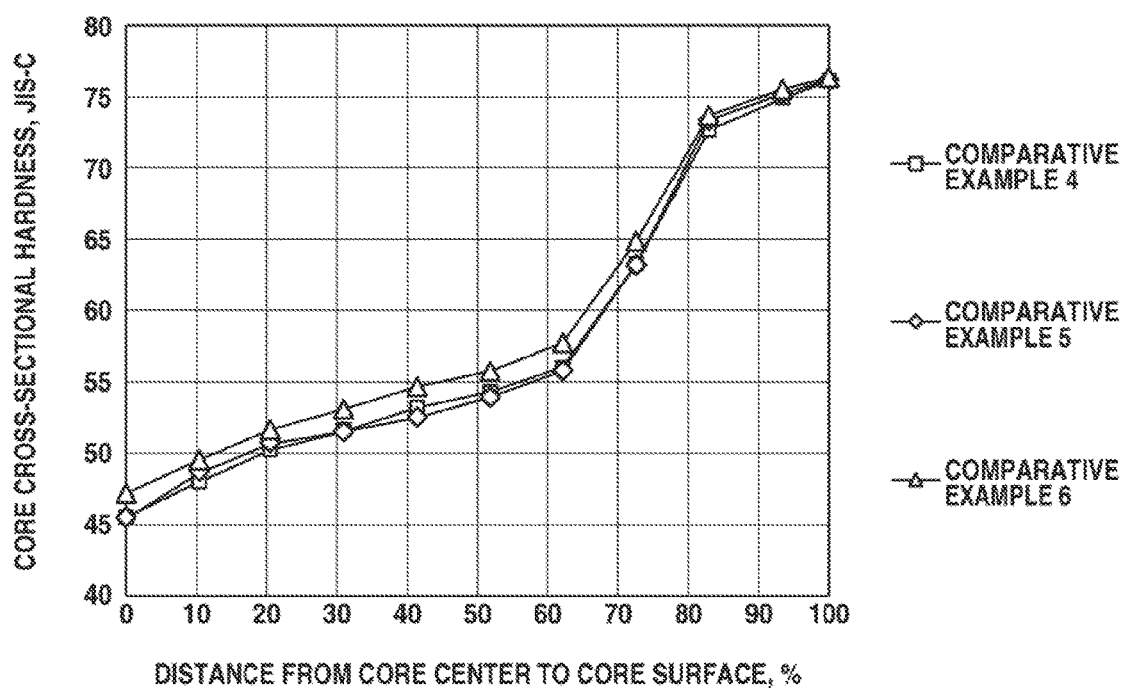
FIG. 6 is a graph showing the hardness profiles of the golf ball cores in Comparative Examples 4 to 6.

FIGS. 1 to 6 shows graphs of the hardness profiles measured as described above for the golf ball cores in Working Examples 1 to 14 and Comparative Examples 1 to 6.

Next, using an injection mold, an ionomer resin material was injection-molded over the core surface, thereby forming an intermediate layer having a thickness of 1.25 mm and a Shore D hardness of 63.

The ionomer resin material used was a blend of the ionomers available from DuPont-Mitsui Polychemicals Co., Ltd. under the trade names Himilan 1605, Himilan 1706 and Himilan 1557.

Next, using a different injection mold, a urethane resin material was injection-molded over the intermediate layer-encased sphere, thereby forming an outermost layer having a thickness of 0.8 mm and a Shore D hardness of 47.

The urethane resin material used was a urethane compound of the products available from DIC Bayer Polymer Ltd. under the trade names Pandex T8283, Pandex T8290 and Pandex T8295.

The deformation under specific loading (deflection), spin rate on shots with a driver, durability to impact and ball productivity for each of the resulting golf balls were evaluated by the following methods. The results are shown in Tables 3 and 4.

Ball Deflection

The deflection (mm) of a golf ball when compressed at a temperature of 23±1° C. and a speed of 10 mm/s to a final load of 1,275 N (130 kgf) from an initial load of 98 N (10 kgf) was measured, and the average value for ten measured golf balls was determined.

Spin Rate on Shots with Driver

A Tourstage X-drive 705 (loft angle, 10.5°) driver manufactured by Bridgestone Sports Co., Ltd. was mounted on a golf swing robot and used to strike balls at a head speed of 45 m/s. The spin rate of the ball immediately after impact was measured with an apparatus for measuring initial conditions, and the average of the measurements for ten golf balls was calculated. In Table 3, the spin rate difference was determined relative to a spin rate of 0 (reference value) for the ball in Comparative Example 1. Similarly, in Table 4, the spin rate for the ball in Comparative Example 4 was used as the reference value.

Durability

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set at 43 m/s. The number of shots required for the golf ball to crack was measured, and the average value obtained from measurements for ten golf balls was determined. In Table 3, the durability indexes for the balls in the respective Examples were calculated relative to a reference value of 100 for the number of shots taken when the ball in Comparative Example 1 began to crack. Similarly, in Table 4, the durability indexes were calculated relative to a reference value of 100 for the number of shots taken when the ball in Comparative Example 4 began to crack.

Productivity

When the rubber composition was mixed and extruded, the following were evaluated: mixing time, residue adhering to inner walls of mixing apparatus, coherence of rubber composition following mixture, and surface roughness of rubber composition when extruded. These were judged collectively as being indicative of either high productivity ((food) or low productivity (NG).

TABLE 3

|  |  |  | Working Example | | | | | | | Comparative Example | | |
|---|---|---|---|---|---|---|---|---|---|---|---|---|
|  |  |  | 1 | 2 | 3 | 4 | 5 | 6 | 7 | 1 | 2 | 3 |
| Core | Deformation under load (mm) | | 2.80 | 2.64 | 2.52 | 2.77 | 2.86 | 2.84 | 2.54 | 3.05 | 3.00 | 2.87 |
|  | Hardness profile (JIS-C) | Center hardness | 63.1 | 63.5 | 64.0 | 61.5 | 62.0 | 63.0 | 63.8 | 59.3 | 59.5 | 60.9 |
|  |  | Hardness at 10.4% point (2 mm) | 64.3 | 64.9 | 65.4 | 62.9 | 63.7 | 63.8 | 65.2 | 61.5 | 61.8 | 63.0 |
|  |  | Hardness at 20.8% point (4 mm) | 66.1 | 66.5 | 66.8 | 65.7 | 66.0 | 65.9 | 66.5 | 63.3 | 63.4 | 64.8 |
|  |  | Hardness at 31.1% point (6 mm) | 67.7 | 68.2 | 68.5 | 67.3 | 67.3 | 67.5 | 68.4 | 65.4 | 65.7 | 66.8 |
|  |  | Hardness at 41.5% point (8 mm) | 69.3 | 70.4 | 70.8 | 68.9 | 68.8 | 69.1 | 70.5 | 66.6 | 66.3 | 68.1 |
|  |  | Hardness at 51.9% point (10 mm) | 71.0 | 72.9 | 74.7 | 70.8 | 71.1 | 70.9 | 74.4 | 67.8 | 67.7 | 69.3 |
|  |  | Hardness at 62.3% point (12 mm) | 74.5 | 77.6 | 80.0 | 75.0 | 74.5 | 74.4 | 79.9 | 69.2 | 69.7 | 71.4 |
|  |  | Hardness at 72.6% point (14 mm) | 82.0 | 83.7 | 85.1 | 81.9 | 80.3 | 81.8 | 84.9 | 77.0 | 77.5 | 78.7 |
|  |  | Hardness at 83.0% point (16 mm) | 86.6 | 88.1 | 89.2 | 86.5 | 85.5 | 86.3 | 89.0 | 84.0 | 85.0 | 85.5 |
|  |  | Hardness at 93.4% point (18 mm) | 88.7 | 89.3 | 89.7 | 88.2 | 88.5 | 88.4 | 89.5 | 88.6 | 88.8 | 88.6 |
|  |  | Surface hardness | 90.7 | 90.4 | 90.2 | 89.8 | 90.2 | 90.2 | 89.9 | 90.4 | 91.0 | 89.8 |
|  |  | Surface hardness − Center hardness | 27.6 | 26.9 | 26.2 | 28.3 | 28.2 | 27.2 | 26.1 | 31.1 | 31.5 | 28.9 |
|  |  | Hardness gradient (between 2 points) 31.1% point-Center | 0.77 | 0.78 | 0.75 | 0.97 | 0.88 | 0.75 | 0.77 | 1.02 | 1.03 | 0.98 |
|  |  | 62.3% point-31.1% point | 1.13 | 1.57 | 1.92 | 1.28 | 1.20 | 1.15 | 1.92 | 0.63 | 0.67 | 0.77 |
|  |  | 72.6% point-31.1% point | 1.79 | 1.94 | 2.08 | 1.83 | 1.63 | 1.79 | 2.06 | 1.45 | 1.48 | 1.49 |
|  |  | Surface-62.3% point | 2.21 | 1.75 | 1.39 | 2.02 | 2.14 | 2.16 | 1.37 | 2.89 | 2.91 | 2.51 |
|  |  | Surface-72.6% point | 1.63 | 1.26 | 0.96 | 1.48 | 1.86 | 1.58 | 0.94 | 2.52 | 2.54 | 2.08 |
| Ball | Deformation under load (mm) | | 2.25 | 2.13 | 2.05 | 2.22 | 2.29 | 2.27 | 2.06 | 2.33 | 2.31 | 2.24 |
|  | Spin rate on shots with driver (rpm) | | −20 | −10 | 0 | −20 | −20 | −20 | −20 | 0 | 0 | 10 |
|  | Durability | | 150 | 200 | 230 | 150 | 150 | 150 | 230 | 100 | 100 | 120 |
| Productivity | | | good | good | good | good | good | good | good | NG | good | NG |

TABLE 4

|  |  |  | Working Example | | | | | | | Comparative Example | | |
|---|---|---|---|---|---|---|---|---|---|---|---|---|
|  |  |  | 8 | 9 | 10 | 11 | 12 | 13 | 14 | 4 | 5 | 6 |
| Core | Deformation under load (mm) | | 4.62 | 4.42 | 4.31 | 4.58 | 4.67 | 4.65 | 4.31 | 4.88 | 4.85 | 4.64 |
|  | Hardness profile (JIS-C) | Center hardness | 47.8 | 48.8 | 49.6 | 47.7 | 47.7 | 47.7 | 49.5 | 45.5 | 45.5 | 47.2 |
|  |  | Hardness at 10.4% point (2 mm) | 49.4 | 50.3 | 51.1 | 48.7 | 49.4 | 49.3 | 51.0 | 48.0 | 48.7 | 49.5 |
|  |  | Hardness at 20.8% point (4 mm) | 51.0 | 51.9 | 52.7 | 50.1 | 50.2 | 50.8 | 52.6 | 50.2 | 50.7 | 51.7 |
|  |  | Hardness at 31.1% point (6 mm) | 53.2 | 54.0 | 54.7 | 52.5 | 53.1 | 53.0 | 54.6 | 51.7 | 51.5 | 53.1 |
|  |  | Hardness at 41.5% point (8 mm) | 54.6 | 55.5 | 56.2 | 54.1 | 54.5 | 54.4 | 56.1 | 53.2 | 52.5 | 54.7 |
|  |  | Hardness at 51.9% point (10 mm) | 56.5 | 57.9 | 59.1 | 57.2 | 57.0 | 56.3 | 59.0 | 54.3 | 54.0 | 55.8 |
|  |  | Hardness at 62.3% point (12 mm) | 60.0 | 63.4 | 66.0 | 61.4 | 60.8 | 59.9 | 65.8 | 56.0 | 55.8 | 57.7 |
|  |  | Hardness at 72.6% point (14 mm) | 68.2 | 69.9 | 71.3 | 68.8 | 67.7 | 68.1 | 71.2 | 63.3 | 63.2 | 64.9 |
|  |  | Hardness at 83.0% point (16 mm) | 73.0 | 74.5 | 75.6 | 74.0 | 72.3 | 72.8 | 75.7 | 72.6 | 73.4 | 73.7 |
|  |  | Hardness at 93.4% point (18 mm) | 75.3 | 76.4 | 77.2 | 76.2 | 75.0 | 75.1 | 77.3 | 74.9 | 75.2 | 75.5 |
|  |  | Surface hardness | 77.4 | 78.2 | 78.6 | 77.2 | 77.0 | 77.2 | 78.6 | 76.1 | 76.2 | 76.4 |
|  |  | Surface hardness − Center hardness | 29.6 | 29.4 | 29.0 | 29.5 | 29.3 | 29.5 | 29.1 | 30.6 | 30.7 | 29.2 |
|  |  | Hardness gradient (between 2 points) 31.1% point-Center | 0.90 | 0.87 | 0.85 | 0.80 | 0.90 | 0.88 | 0.85 | 1.03 | 1.00 | 0.98 |
|  |  | 62.3% point-31.1% point | 1.13 | 1.57 | 1.88 | 1.48 | 1.28 | 1.15 | 1.87 | 0.72 | 0.72 | 0.77 |
|  |  | 72.6% point-31.1% point | 1.88 | 1.99 | 2.08 | 2.04 | 1.83 | 1.89 | 2.08 | 1.45 | 1.46 | 1.48 |
|  |  | Surface-62.3% point | 2.38 | 2.02 | 1.72 | 2.16 | 2.21 | 2.36 | 1.75 | 2.74 | 2.78 | 2.55 |
|  |  | Surface-72.6% point | 1.73 | 1.56 | 1.37 | 1.58 | 1.75 | 1.71 | 1.39 | 2.40 | 2.44 | 2.16 |
| Ball | Deformation under load (mm) | | 3.51 | 3.39 | 3.30 | 3.49 | 3.58 | 3.51 | 3.30 | 3.65 | 3.64 | 3.55 |
|  | Spin rate on shots with driver (rpm) | | −10 | −10 | 0 | −10 | −10 | −10 | 0 | 0 | 0 | 10 |
|  | Durability | | 130 | 150 | 160 | 130 | 120 | 130 | 160 | 100 | 100 | 105 |
| Productivity | | | good | good | good | good | good | good | good | NG | good | NG |

As is apparent from Tables 3 and 4, relative to the golf balls in the Comparative Examples, the golf balls according to this invention have an enhanced durability without a rise in spin rate on shots with a driver, and also have a high productivity.

Japanese Patent Application No. 2016-123561 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rubber composition for golf balls, comprising:
    (A) a base rubber,
    (B) two different metal salts of α,β-unsaturated carboxylic acids having 3 to 8 carbon atoms,
    (C) a metal salt in which at least one bonding site is a fatty acid of 9 or more carbon atoms, and
    (D) a crosslinking initiator,
wherein, component (B) includes (B-1) an unsaturated metal carboxylate in a high compounding weight and (B-2) an unsaturated metal carboxylate in a low compounding weight, the ratio (B-2)/(B-1) is from 4 to 20 wt % and the ratio (B-2)/(C) is from 20 to 115 wt %, and component (C) is selected from the group consisting of zinc monostearate monopalmitate, zinc monostearate monomyristate, zinc monostearate monolaurate, zinc monopalmitate monomyristate, zinc monopalmitate monolaurate, zinc monostearate monoacrylate, zinc monostearate monomethacrylate, zinc monostearate monomaleate, zinc monostearate monofumarate, zinc monopalmitate monoacrylate, zinc monopalmitate monomethacrylate, zinc monopalmitate monomaleate, zinc monopalmitate monofumarate, zinc monomyristate monoacrylate, zinc monomyristate monomethacrylate, zinc monomyristate monomaleate, zinc monomyristate monofumarate, zinc monolaurate monoacrylate, zinc monolaurate monomethacrylate, zinc monolaurate monomaleate and zinc monolaurate monofumarate.

2. The rubber composition of claim 1, wherein component (B-1) is zinc acrylate and component (B-2) is zinc methacrylate.

3. The rubber composition of claim 1 which further comprises (E) water.

4. A golf ball having a core and a cover of one or more layer that encases the core, wherein the core is formed of the rubber composition of claim 1.

5. The golf ball of claim 4 which has a core hardness profile wherein the JIS-C hardness difference between a surface and a center of the core is at least 20 and the hardness gradient between a point located 72.6% of the core radius from the core center and the core surface is from 0.79 to 1.87.

6. The golf ball of claim 4 which has a core hardness profile wherein the JIS-C hardness difference between a surface and a center of the core is at least 20 and the hardness gradient between a point located 72.6% of the core radius from the core center and a point located 31.1% of the core radius from the core center is from 1.49 to 2.08.

7. The golf ball of claim 4 which has a core hardness profile wherein the JIS-C hardness difference between a surface and a center of the core is at least 20 and the hardness gradient between a point located 62.3% of the core radius from the core center and the core surface is from 1.10 to 2.45.

8. The golf ball of claim 4 which has a core hardness profile wherein the JIS-C hardness difference between a surface and a center of the core is at least 20 and a hardness gradient between a point located 62.3% of the core radius from the core center and a point located 31.1% of the core radius from the core center is from 0.78 to 1.93.

9. The golf ball of claim 4, wherein the core hardness profile is such that the hardness remains the same or increases, and does not decrease, from the center toward the surface of the core.

* * * * *